United States Patent [19]
Valyi

[11] Patent Number: 5,401,457
[45] Date of Patent: Mar. 28, 1995

[54] PROCESS FOR FORMING A COLOR COATED ARTICLE

[76] Inventor: Emery I. Valyi, 19 Moseman Ave., Katonah, N.Y. 10536

[21] Appl. No.: 112,980

[22] Filed: Aug. 30, 1993

Related U.S. Application Data

[63] Continuation of Ser. No. 924,512, Aug. 4, 1992, abandoned.

[51] Int. Cl.⁶ .................. B29C 33/18; B29C 33/30; B29C 45/16
[52] U.S. Cl. .................. 264/511; 264/513; 264/153; 264/266; 425/305.1
[58] Field of Search .............. 264/265, 266, 267, 163, 264/511, 513, 153; 425/305.1

[56] References Cited
U.S. PATENT DOCUMENTS

| | | |
|---|---|---|
| 3,939,239 | 2/1976 | Valyi ............................ 264/511 |
| 4,013,748 | 3/1977 | Valyi ............................ 264/511 |
| 4,289,817 | 9/1981 | Valyi ............................ 264/511 |
| 4,639,341 | 1/1987 | Hanamoto et al. .............. 264/511 |
| 4,923,539 | 5/1990 | Spengler et al. ............... 264/511 |
| 5,188,787 | 2/1993 | King et al. ................... 264/163 |
| 5,225,213 | 7/1993 | Brown et al. ................. 264/163 |

Primary Examiner—Jan H. Silbaugh
Assistant Examiner—Angela Ortiz
Attorney, Agent, or Firm—Bachman & LaPointe

[57] ABSTRACT

A color coated article is formed by applying a color coated material to an injection mold having mold halves, a mold cavity edge and a mold cavity therein for the formation of an injection molded article, and injecting molten plastic into the mold cavity to form a laminated article with the color coated material bonded to the injected plastic. The process uses a color coated blank cut from a web and transfers the blank into registry with at least one of the mold halves.

17 Claims, 4 Drawing Sheets

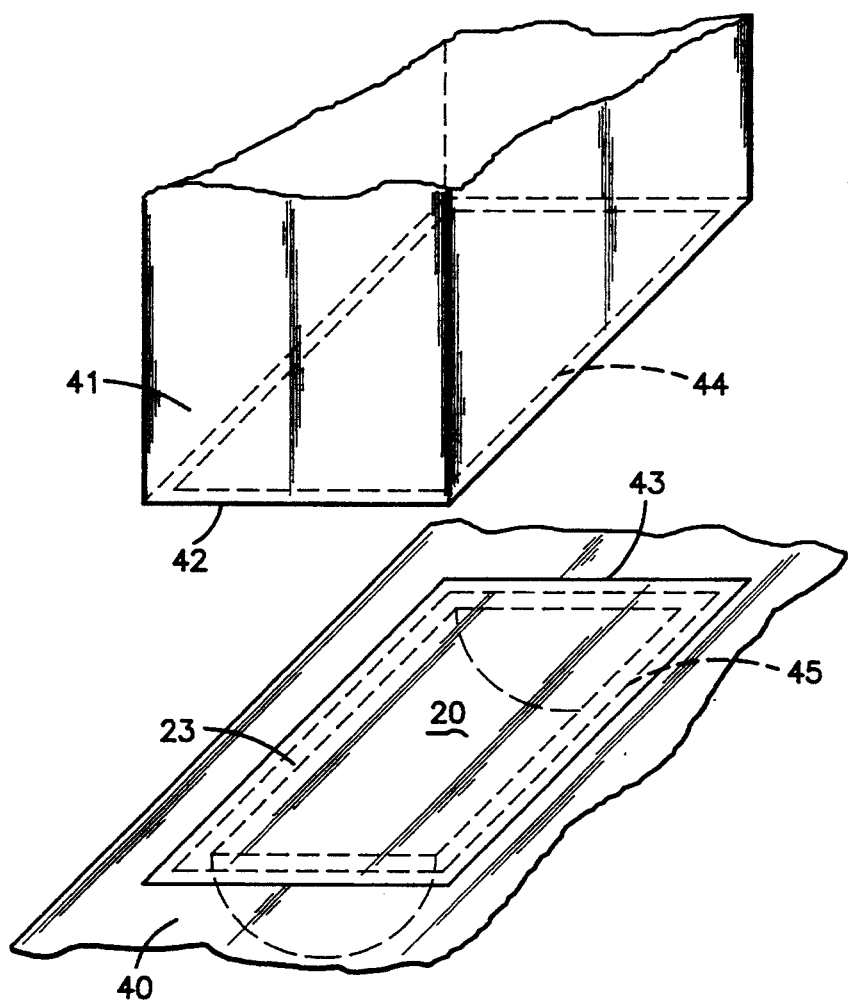
FIG-3
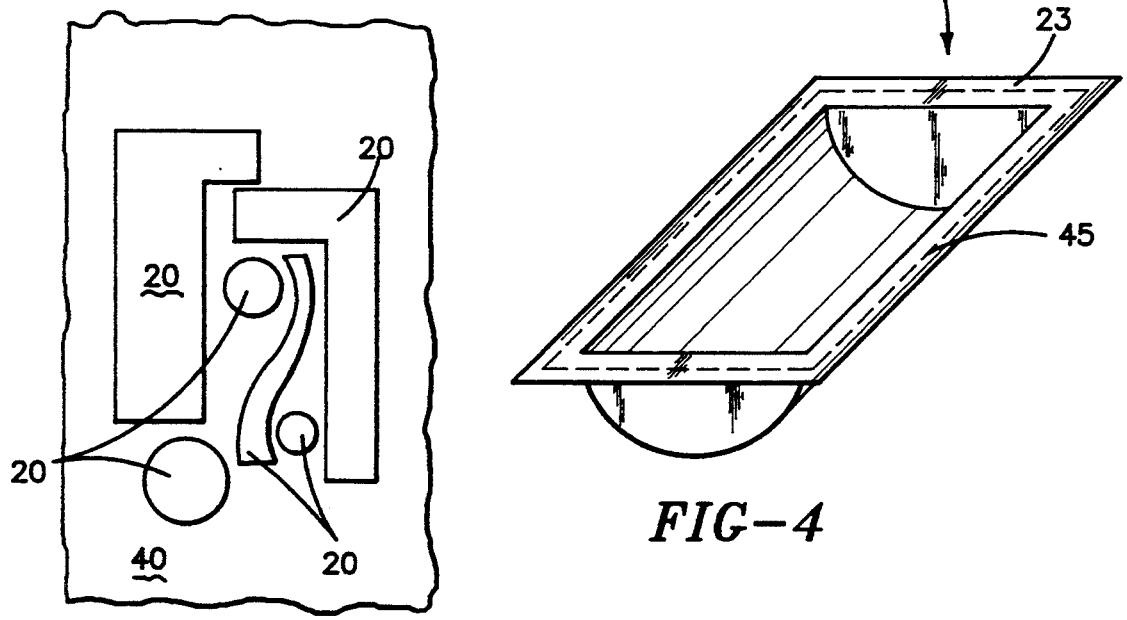
FIG-5
FIG-4

PROCESS FOR FORMING A COLOR COATED ARTICLE

This is a Continuation of application Ser. No. 924,512 filed Aug. 4, 1992, now abandoned.

BACKGROUND OF THE INVENTION

In-mold coating involves the use of a film from which a shell is formed corresponding to the shape of one half a pressure mold, usually the cavity, by conventional thermoforming, or by using the pressure mold cavity itself as the thermoforming tool. If the latter, the film may be preheated and formed in that cavity, with the formed shell juxtaposed with the other mold half, to form a plastic molded part therein. Alternately, the film may be clamped against one parting face of a pressure mold and the plastic molded against it, whereby the latter softens the film and forces it into the cavity. Of course, the film may also be preheated before the pressure molding step.

Whichever procedure is followed, a laminated pressure molded plastic article is formed with a skin consisting of the film. The skin may be colored or decorated to provide a decorated or color coated article.

It is highly desirable to provide an improved process for forming a color coated article of the aforesaid type. The cost of the film and the process of introducing it into the pressure mold represent major parts of the total cost of applying a finish to the pressure molded article in the foregoing procedure.

Further, as described above, the shell is formed by thermoforming, whether in a separate mold, or in the pressure molding cavity. Thus, it is drawn from a sheet that is typically large enough to accommodate the formation of several shells at the same time, meaning that several thermoforming mold cavities must be placed in juxtaposition with the sheet. This, in turn, leaves spaces between the cavities covered by film stock not used to make shells and is thus wasted. The shells so formed are then punched out of one sheet, to be placed into the pressure molding cavities, and the rest of the expensive sheet, the so-called "skeleton scrap", is discarded.

When the shell is formed in the pressure molding cavities of multi-impression molds, the amount of skeleton scrap is greater than for thermoforming done separately, because the spacing of cavities in thermoforming is closer than in pressure molding of molten plastic.

With separately thermoformed shells, an additional problem arises when attempting to place the shells into the pressure molding cavity accurately enough to avoid folds and other defects due to the pressure molding step.

Accordingly, it is a principal object of the present invention to provide an improved process for forming a color coated article using in-mold coating.

It is a further object of the present invention to provide an improved process as aforesaid which minimizes scrap formation and defects in processing.

It is a still further object of the present invention to provide a process as aforesaid which is economical and easy to use.

Further objects and advantages of the present invention will appear hereinbelow.

SUMMARY OF THE INVENTION

In accordance with the present invention, the foregoing objects and advantages are readily obtained.

In the present invention, a process for forming a color coated or decorated article is provided by applying a color coated material to an injection mold having mold halves, a mold parting face, mold cavity edge and a mold cavity therein for the formation of an injection molded article, and injecting molten plastic into said mold cavity to form a laminated article with the color coated material bonded to the injected plastic. The improvement of the present invention comprises: cutting a color coated blank from a web in a size and shape adapted to fit between the mold halves and with a rim portion thereof adapted to mate with the mold cavity edge at the parting face of the mold; transferring the blank into registry with at least one of the mold halves and retaining the rim portion thereof on the mold cavity edge; deforming the blank to conform to said at least one mold half and closing the mold halves to form a mold cavity; and injecting molten plastic into the mold cavity to form a laminated, injection molded article with the color coated blank bonded to the injected plastic. The color coated blank can be color coated over the entire surface or provided with a color coating over part of the surface, as desired.

The rim portion of the blank may be retained on the mold cavity edge by suction or mechanical means, and the blank deformed under pressure or by a mold core.

The blank is preferably cut by stamping and the rim portion of the blank preferably scored for convenience of subsequent trimming. The stamping and scoring may be conveniently performed at the same time in a single operation.

The blank is preferably transferred by a holding means and is preferably pre-heated before deforming, wherein the pre-heating may be performed by the holding means.

Other features and advantages of the present invention will appear hereinbelow.

BRIEF DESCRIPTION OF THE DRAWINGS

The present invention will be more readily understood from a consideration of the accompanying illustrative drawings, in which:

FIG. 3 is a perspective view of a web with a blank cut therefrom;

FIG. 4 is a perspective view of an article formed in the process of the present invention;

FIG. 5 is a top view of a web showing the formation of different size blanks;

DETAILED DESCRIPTION

Figure 1:
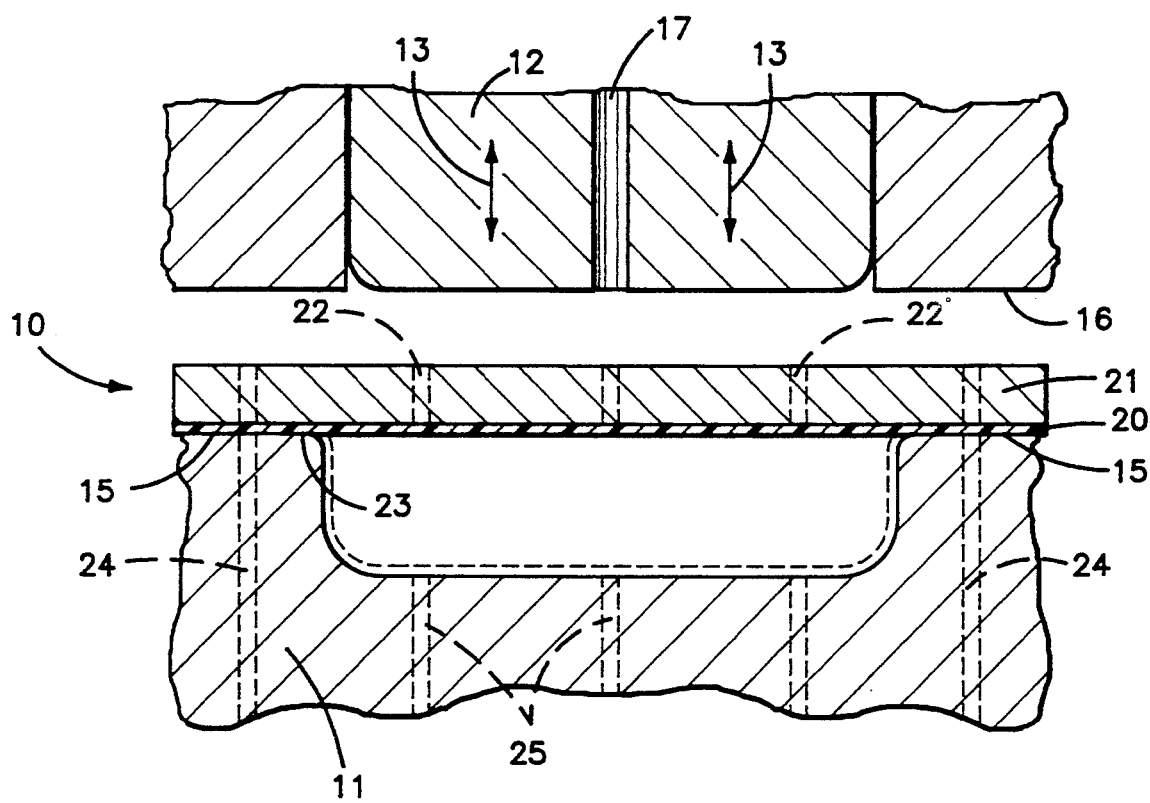
FIG. 1 is a partly schematic sectional view of the process of the present invention with the mold halves spaced apart and the blank positioned in registry therewith.
Figure 2:
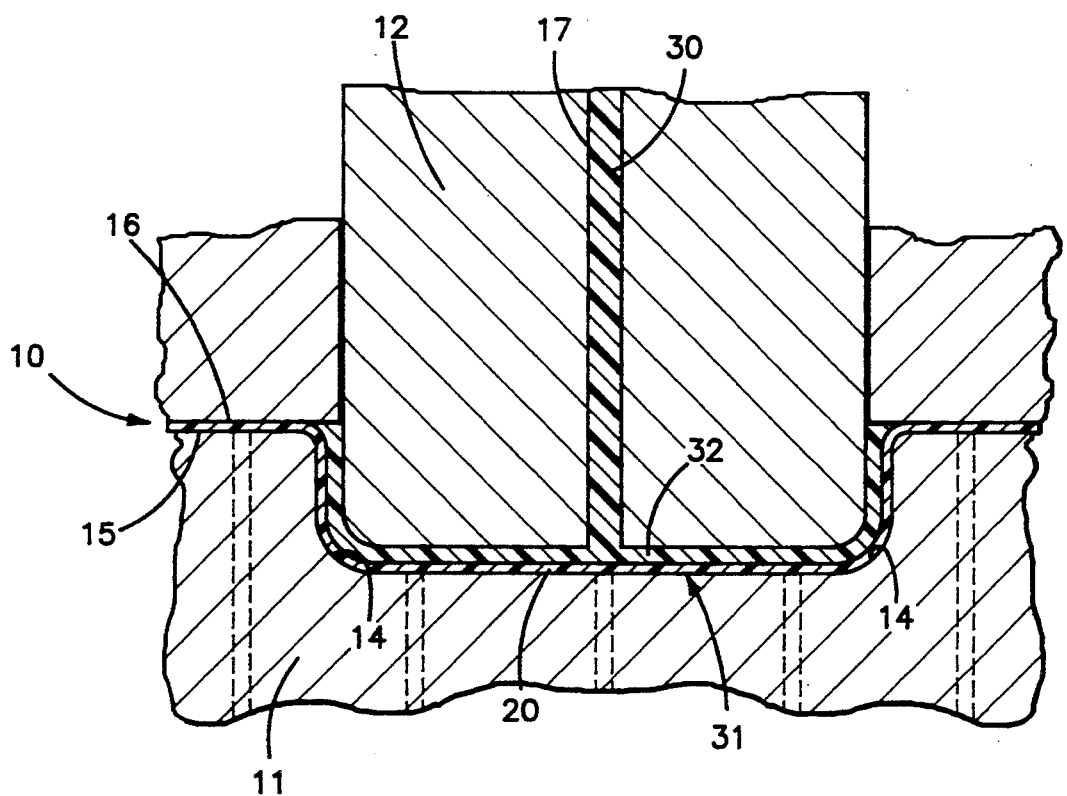
FIG. 2 is a view similar to FIG. 1 with the mold halves closed to form a mold cavity and the laminated article formed therein.

Referring to FIGS. 1 and 2, injection mold 10 is provided with a mold cavity half 11 and core mold half 12. Core 12 is movable in the direction of arrows 13 towards and away from mold half 11 by suitable motive means (not shown) to form mold cavity 14 between the mold halves as clearly shown in FIG. 2. At their parting face, mold half 11 has a mold edge 15 adjacent mold cavity 14, and core 12 has a corresponding core mold edge or hold down rim 16 movable towards and away from mold edge 15 in the direction of arrows 13. Core 12 is provided with at least one injection sprue 17 connected to a source of molten plastic (not shown) for injection of molten plastic into mold cavity 14 when the mold 10 is in the mold closed position shown in FIG. 2.

A color coated blank 20 is transferred between the mold halves into registry with at least one of the mold halves by transfer plate 21 which acts as a holding means for the blank via suction channels 22 connected to a source of suction (not shown). Blank 20 has a rim portion 23 which engages mold edge 15 and is held in conformance therewith via mold edge suction channels 24 also connected to a source of suction (not shown). Blank 20 is then deformed into conformity with mold 11 as by mold suction channels 25 which are also connected to a source of suction (not shown). The blank 20 is released from transfer plate 21 aided by discontinuance of suction from channels 22 or if desired by use of positive pressure through channels 22. Also, if desired mold core 12 can accomplish the deformation of blank 20 into conformity with mold 11 (or aid in said deformation), naturally after removal of plate 21 from between the mold halves.

After removal of plate 21 from between the mold halves, the mold halves are closed by moving core 12 and core mold edge 16 in the direction of arrows 13 into the position shown in FIG. 2 using any desired motive means. The core mold edge 16 engages blank rim portion 23 as shown in FIG. 2 and serves as a mechanical means for holding blank edge portion in conformity with mold edge 15. The blank may also be held in place during pressure molding by other means if desired, as by a hold-down rim.

Alternatively, hold down rim 16 is independently movable and after removal of plate 21 is in constant contact with the blank to hold same in place while the mold is closed. If so constructed, the core is in a fixed position while the cavity half of the mold closes against the core.

Molten plastic 30 is then injected into mold cavity 14 via sprue 17 to form a laminated injection molded article 31 with the color coated blank 20 bonded to the injected plastic 32. The molten injected plastic will locally melt the blank to promote bonding, but bonding aids e.g., adhesives, may be used on the blank if desired.

FIG. 3 shows web 40 with blank 20 cut therein by stamping tool 41. Thus, instead of punching out a formed shell, substantially flat blank 20 is stamped from web 40 via tool 41, having the size and contour of the projected area and shape of the pressure molding cavity 14 (schematically shown in dashed lines in FIG. 3), plus a blank rim portion 23 to form a holding surface between mold halves as shown in FIGS. 1 and 2. Stamping tool 41 is provided with cutting edge 42 to cut the blank at cut line 43 and scoring means 44 to score blank rim portion 23 at score line 45, which corresponds to the mold cavity edge. Scoring means 44 is schematically indicated in dashed lines on stamping tool 41 to show where the scoring edge thereof cuts into the web to form a notch. As shown in FIGS. 1 and 2, blank 20 is placed into registry with at least one of the mold halves to cover the mold face and the blank rim 23 retained on the mold edge while the blank is deformed and the final article formed. Finished article 31 is now obtained as shown in FIG. 4 with blank rim 23 protruding therefrom and which may be removed by tearing at score line 45 by hand or by mechanical means. Alternatively, one may omit the score line and simply remove the rim by any desired means, as by cutting.

Stamping blanks 20 from web 40 allows much closer spacing than thermoforming, let alone pressure molding, and the amount of skeleton scrap is reduced accordingly. Moreover, the layout of blanks 20 on web 40 may be closely packed, according to the geometry thereof, as in the case of differently shaped blanks being stamped from the same sheet at the same time, in which case they may be nested to leave the least space therebetween, as shown in the schematic illustration in FIG. 5.

If desired, for economy, the rim portion of the blank may be left uncolored or undecorated in the areas where it is to be subsequently removed.

Figure 6:
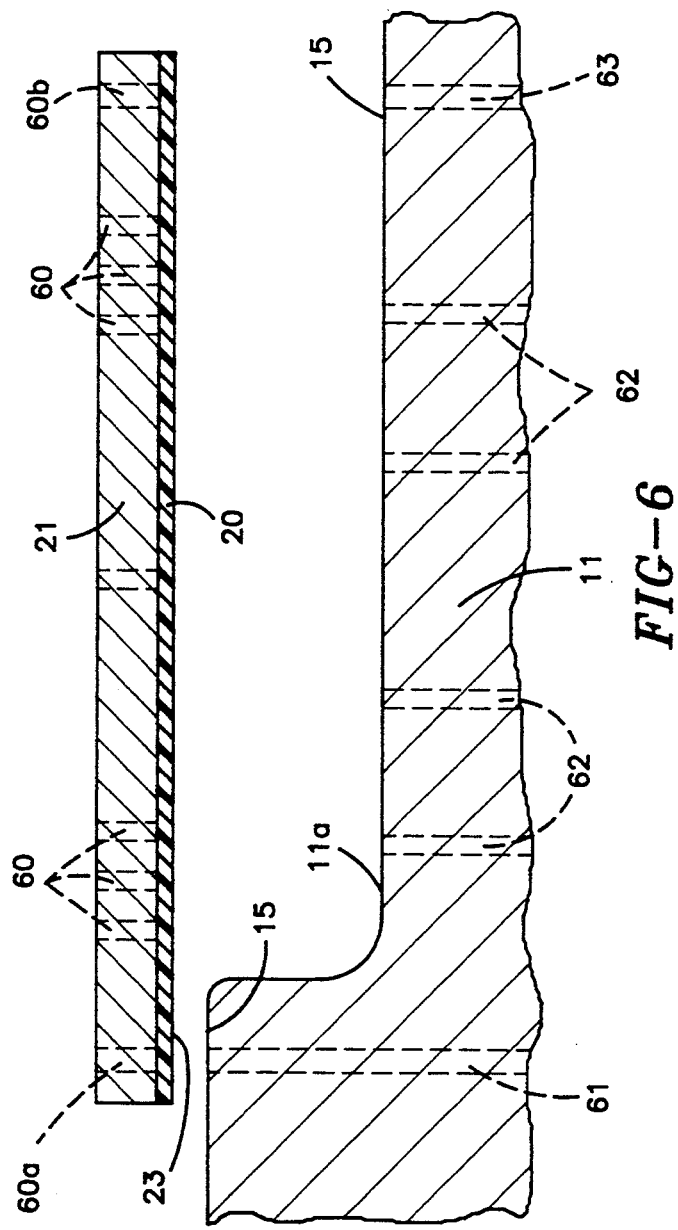
FIG. 6 is a partly schematic view showing the formation of a multi-planar article.
Figure 7:
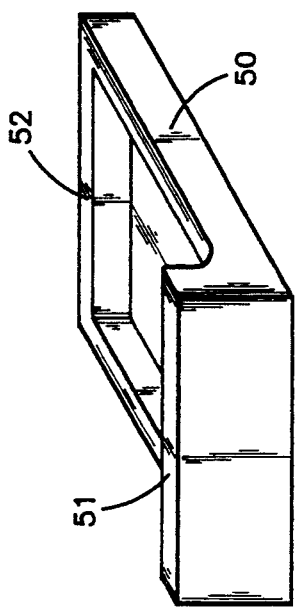
FIG. 7 shows the resultant multi-planar article.

The parting surface surrounding the mold cavity, however, is not always in a single plane. For example, if a multi-planar article is to be formed such as article 50 shown in FIG. 7, the parting surface of the corresponding cavity-half of the mold must allow for different levels 51 and 52 in article 50. Clearly, if a flat blank 20 is to be accurately placed and hermetically held against cavity-half edge or rim 15, it is necessary to transfer the blank from transfer plate 21 onto said rim smoothly, without causing defects, such as wrinkles due to sagging of the warmer blank from plate 21. This may be accomplished as shown in FIG. 6. Film 20 is transferred onto carrier plate 21 and held thereagainst by suction through channels 60, 60a and 60b. It is then placed into registry with mold cavity half 11 as shown in FIG. 6. Plate 21 is heated (not shown in FIG. 6) and therefore so is blank 20 which is rendered deformable thereby. Once the plate and blank are placed in the position shown in FIG. 6, the procedure as follows may be used.

As soon as blank edge or rim portion 23 contacts mold cavity rim or edge 15, suction through channels 60a is replaced by positive pressure and, at the same time suction is applied through upper mold edge channel 61. Simultaneously, suction is maintained through plate edge channel 60b and positive pressure applied through central plate channels 60. Suction is applied through mold cavity channels 62 to conform blank 20 to surface 11a of mold cavity half 11. Thereafter, suction through channel 60b is replaced by positive pressure and suction is applied through lower mold edge channel 63 to complete the cycle.

Figure 8:
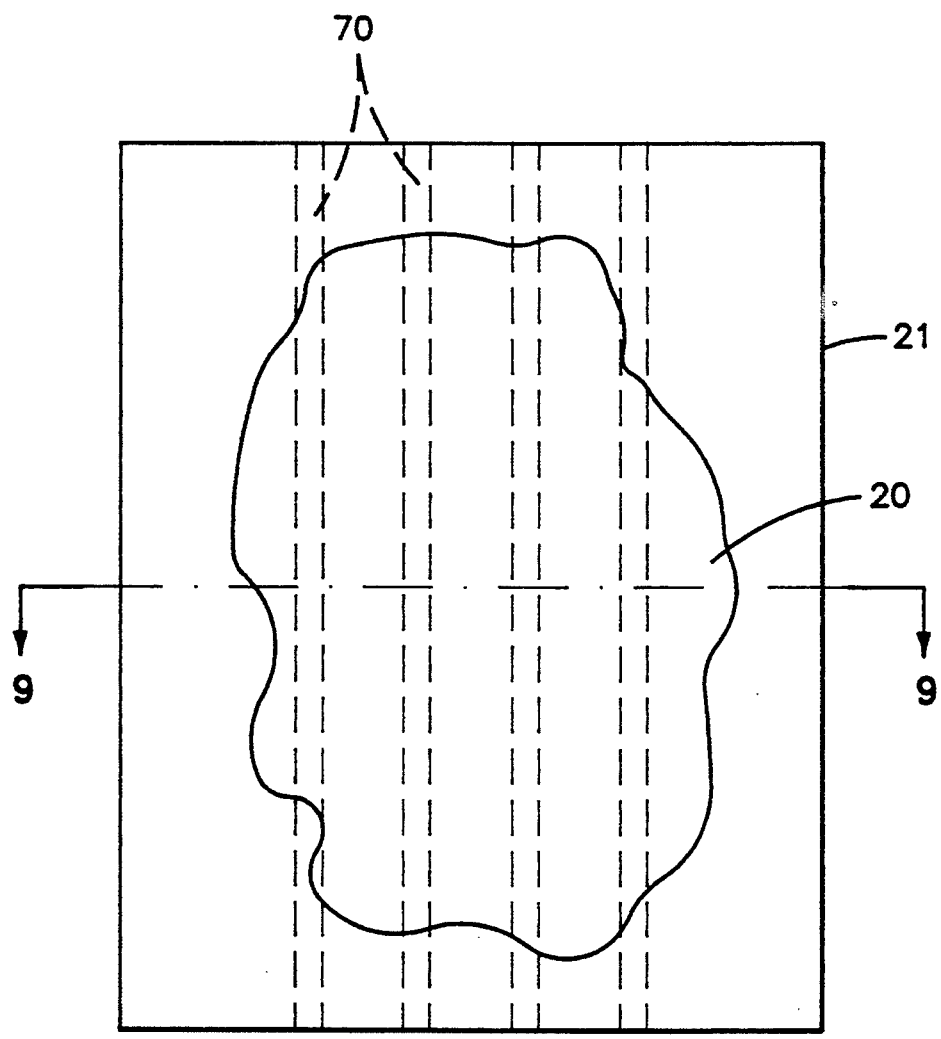
FIG. 8 shows a top view of a heated carrier plate and FIG. 9 is a sectional view along lines IX—IX of FIG. 8.
Figure 9:
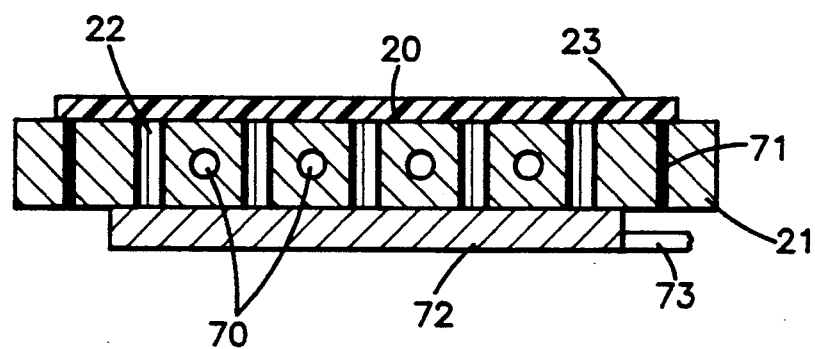

As indicated above, blank 20 must be placed accurately against the parting surface surrounding a mold half and deformed to conform thereto. In order to facilitate deformation of the blank, it is often desirable to preheat same. FIGS. 8 and 9 show a preferred method of preheating the blank by a heated transfer plate 21. Blank 20 is transferred to plate 21 as in the previous embodiments, but plate 21 is equipped with heating means 70, which may be a plurality of heating coils spaced to heat the desired portion of blank 20 as shown in FIG. 8. Provision may be made to keep blank rim portion 23 cool as by providing insulation 71 adjacent said rim portion. Transfer plate channels 22 are supplied with suction or pressure via manifold 72 and pressure line 73 to a source of air suction or pressure, not shown. In order to prevent the blank from sticking to the transfer plate, it is preferred to coat the plate with a non-stick layer, as a Teflon material.

If desired, one could cut and stack a plurality of blanks and use a robot to transfer the blanks to the mold. The blanks are preferably stacked as they are cut from the web according to FIG. 3 and the stacks placed alongside the molding apparatus, such as an injection molding machine. They are then destacked using a robot (not shown) having an end-of-arm which carries the transfer-plate shown in FIGS. 8 and 9. The transfer plate 21 removes the blank from the stack by suction and is then moved as above described into alignment with the mold, by the robot.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In a process for forming a color coated article by applying a color coated material to an injection mold having mold halves, a mold parting face, a mold cavity edge and a mold cavity therein for the formation of an injection molded article, and injecting molten plastic into said mold cavity to form a laminated article with the color coated material bonded to the injected plastic, the improvement which comprises:

cutting a color coated blank by means independent of said mold halves from a web to form a substantially flat pre-cut undeformed blank in a size and shape adapted to fit between the mold halves and with a rim portion thereof adapted to mate with the mold cavity edge at the parting face of the mold;

transferring said undeformed pre-cut blank into registry with at least one of said mold halves, said blank being transferred by a holding means independent of said mold halves and retained on the holding means during transfer, and retaining the rim portion thereof on the mold cavity edge;

releasing the blank from the holding means and removing the holding means from the blank;

clamping the blank between the mold halves at the mold cavity edge;

deforming the clamped blank to conform to said at least one mold half and closing the mold halves to form a mold cavity, wherein the blank is deformed at least in part by a mold half, said deforming step being conducted after transferring the pre-cut blank into registry with at least one of said mold halves and while retaining the rim portion of the blank on the mold cavity edge; and injecting molten plastic into the mold cavity against the blank to form a laminated, injection molded article with the color coated blank bonded to the injected plastic.

2. A process according to claim 1 wherein the blank is color coated over the entire surface thereof.

3. A process according to claim 1 wherein the rim portion of the blank is retained on the mold cavity edge at least by suction.

4. A process according to claim 1 wherein the rim portion of the blank is retained on the mold cavity edge at least by mechanical means.

5. A process according to claim 1 wherein the blank is deformed under pressure.

6. A process according to claim 1 wherein the blank is cut by stamping.

7. A process according to claim 1 including the step of scoring the rim portion of the blank.

8. A process according to claim 7 wherein the blank is cut by stamping and the rim portion of the blank scored at the same time.

9. A process according to claim 1 wherein the blank is transferred by a holding means and retained thereon at least in part by suction during transfer.

10. A process according to claim 1 wherein the injection mold includes a mold core and wherein the blank is deformed at least in part by the mold core.

11. A process according to claim 1 including the step of preheating the blank at least in part before deforming.

12. A process according to claim 11 wherein the preheating step is performed at least in part by a holding means which transfers the blank.

13. A process according to claim 1 including the step of forming a multi-planar article.

14. A process according to claim 13 including the steps of first holding a first edge portion of the blank against a first edge portion of a mold cavity half in a first plane, followed by deforming a second edge portion of the blank against a second edge portion of a mold cavity half in a second plane.

15. A process according to claim 1 including the step of transferring said blank by a holding means having a substantially flat face engaging said blank.

16. A process according to claim 1 wherein the holding means transfers the blank between the mold halves and transfers the rim portion of the blank to the mold cavity edge, including the steps of moving the holding means with blank thereon between the mold halves during the transfer step, and removing the holding means from between the mold halves after transfer of the rim portion of the blank to the mold cavity edge.

17. A process according to claim 16 wherein the holding means includes a substantially flat face, including the steps of holding the blank on said face at least in part by suction, and moving the face between the mold halves.

* * * * *